US012761647B2

(12) United States Patent
Greiner et al.

(10) Patent No.: US 12,761,647 B2
(45) Date of Patent: Oct. 13, 2026

(54) PATH COLLISION AVOIDANCE

(71) Applicant: Design Mill Inc., Dubuque, IA (US)

(72) Inventors: Nathan L. Greiner, Hanover, IA (US); Alexander Jon Schuster, Dubuque, IA (US); Jasmine Nobis-Olson, Elizabeth, IL (US); Jane Marie McCleary, Cuba City, WI (US); William Blanchard, Ames, IA (US); Ivan G. Thomas, Fredericksburg, VA (US); Harris R. Seabold, Ames, IA (US); Adarsh Krishnamurthy, Ames, IA (US); Sambit Ghadai, Folsom, CA (US); Harshil Shah, Folsom, CA (US); Dhruv Dhiraj Gamdha, Ames, IA (US); Geoffrey Jacobs, San Marcos, CA (US)

(73) Assignee: Design Mill Inc., Dubuque, IA (US)

( * ) Notice: Subject to any disclaimer, the term of this patent is extended or adjusted under 35 U.S.C. 154(b) by 151 days.

(21) Appl. No.: 18/205,933

(22) Filed: Jun. 5, 2023

(65) Prior Publication Data

US 2023/0418288 A1 Dec. 28, 2023

Related U.S. Application Data

(60) Provisional application No. 63/348,870, filed on Jun. 3, 2022.

(51) Int. Cl.

| | |
|---|---|
| ***G05D 1/00*** | (2024.01) |
| ***B60W 60/00*** | (2020.01) |
| ***G05D 1/02*** | (2020.01) |
| ***G06T 19/00*** | (2011.01) |

(52) U.S. Cl.
CPC ......... *G05D 1/0044* (2013.01); *G05D 1/0214* (2013.01); *G06T 19/003* (2013.01);
(Continued)

(58) Field of Classification Search
CPC .. G05D 1/0044; G05D 1/0214; G05D 1/2435; G05D 1/637; G05D 1/2465;
(Continued)

(56) References Cited

U.S. PATENT DOCUMENTS 9,183,676 B2 * 11/2015 McCulloch ........... G06T 19/006
9,754,413 B1 * 9/2017 Gray .................... H04N 23/698
(Continued)

OTHER PUBLICATIONS

D. Teissandier et al., "Algorithm to calculate the Minkowski sums of 3-polytopes dedicated to tolerance analysis", Jun. 15-17, 2011, Proceedings of the IMProVe 2011, International conference on Innovative Methods in Product Design, p. 521. (Year: 2011).*

*Primary Examiner* — Rodney A Butler
(74) *Attorney, Agent, or Firm* — Rathe Lindenbaum LLP

(57) ABSTRACT

A path collision avoidance method and system may include obtaining a three-dimensional point cloud of an at least partially enclosed space, obtaining a voxelized model of a vehicle/robot, and outputting a visual representation of navigation of the vehicle/robot within the at least partially enclosed space based on the three-dimensional point cloud of the at least partially enclosed space and the voxelized model of the vehicle/robot.

18 Claims, 8 Drawing Sheets

(52) U.S. Cl.
CPC ...... *B60W 60/0015* (2020.02); *G06T 2210/21* (2013.01); *G06T 2210/56* (2013.01)

(58) Field of Classification Search
CPC ........... G05D 2105/22; G05D 2107/30; G05D 2109/10; G05D 2111/64; G06T 19/003; G06T 2210/21; G06T 2210/56; G06T 2210/04; G06T 2219/004; B60W 60/0015; B60W 60/0025
See application file for complete search history.

(56) References Cited

U.S. PATENT DOCUMENTS

| | | | | |
|---|---|---|---|---|
| 9,928,661 | B1 * | 3/2018 | Kinstner | A63F 13/20 |
| 10,303,180 | B1 * | 5/2019 | Prats | G05D 1/0212 |
| 11,100,669 | B1 * | 8/2021 | Zhou | G01S 13/867 |
| 11,164,363 | B2 * | 11/2021 | Zhou | G06V 10/82 |
| 2009/0326711 | A1 * | 12/2009 | Chang | B25J 9/1666 700/255 |
| 2014/0002476 | A1 * | 1/2014 | Tam | G09G 5/02 345/589 |
| 2018/0275277 | A1 * | 9/2018 | Li | G01S 17/89 |
| 2019/0204741 | A1 * | 7/2019 | Kaitz | G03F 7/16 |
| 2019/0382003 | A1 * | 12/2019 | Jiang | G08G 1/163 |
| 2020/0105025 | A1 * | 4/2020 | Yea | G06T 15/08 |
| 2021/0256718 | A1 * | 8/2021 | Gangundi | G06V 10/82 |
| 2022/0392151 | A1 * | 12/2022 | Blodow | G06T 19/006 |
| 2023/0297069 | A1 * | 9/2023 | Gonzalez Martin | B33Y 50/02 700/98 |

* cited by examiner

LOCATION 1 - ON RAMP LOCATION 1 - ON FLAT LOCATION 3 - NEAR RAMP

PATH COLLISION AVOIDANCE

CROSS-REFERENCE TO RELATED PATENT APPLICATIONS

The present non-provisional patent application claims priority under 35 USC 119 from U.S. Provisional Patent Application Ser. No. 63/348,870 filed on Jun. 3, 2022, by Greiner et al. and entitled PATH COLLISION AVOIDANCE, the full disclosure of which is hereby incorporated by reference.

This invention was made with Government support under Contract No.: M67854-19-C-6506 awarded by MARCORSYSCOM. The Government has certain rights in the invention.

BACKGROUND

Vehicle motion in confined environments plays a significant role in the design of both the vehicles and environment. While designing large, enclosed spaces, the free and efficient movement of vehicles operating in the environment is critical for efficient space utilization. Enclosed environments, such as warehouses, factory floors, tunnels, and transportation mediums, such as ships, require design precision and motion planning to plan collision-free paths with the vehicles operating in them. In general, vehicle collisions with their environment are performed in real time with the help of sensor data to aid in navigation. However, it is not feasible for design purposes to check collisions in real time using physical sensors as redesigning and remodeling the environment becomes costly and inefficient.

BRIEF DESCRIPTION OF THE DRAWINGS

FIG. 3 is a volumetric rendering of a Humvee CAD model with the Minkowski sum operation.

Figure 1:
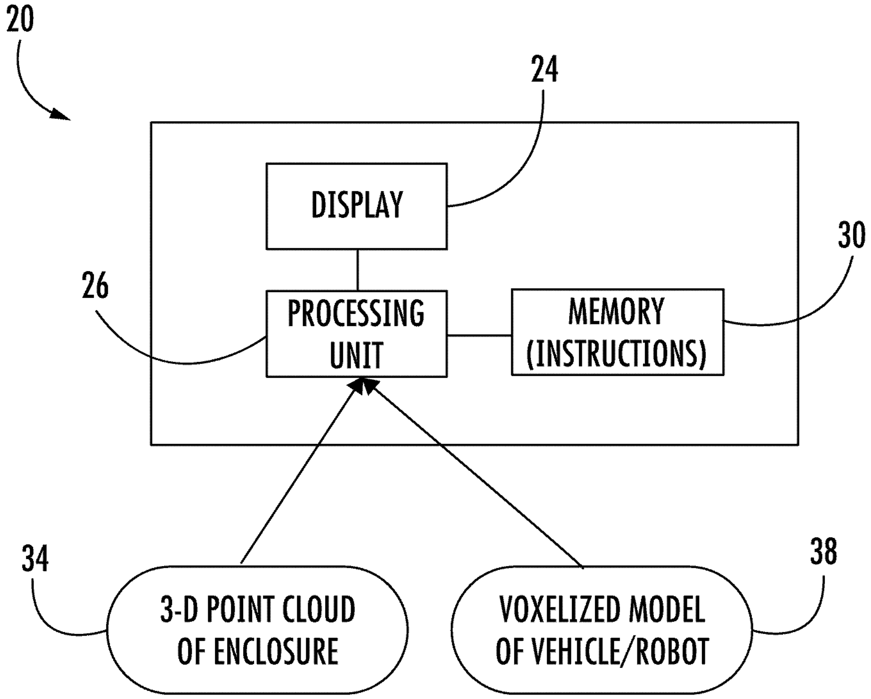
FIG. 1 is a diagram schematically illustrating portions of an example path collision avoidance system.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to processing unit 26 and/or implementations provided in the drawings.

DETAILED DESCRIPTION OF EXAMPLES

Disclosed are example methods and systems that provide an analysis and visualization framework to perform fast collision detection of vehicles with point cloud representations of their environment that provide highly accurate feedback to make efficient design choices. The example methods and systems use a voxelized representation of the vehicle CAD model to perform GPU-accelerated collision computation of voxels with the point cloud data of the environment. In addition, the example methods and systems develop a voxel-based Minkowski addition algorithm that provides flexibility to address design changes on the fly based on user-required clearance constraints.

General CAD boundary representations (B-reps), such as triangular meshes and parametric surfaces, represent a model using 2-D topological elements (triangles or surface patches). Intersection tests may be performed between the surface elements to determine the collision for collision detection with B-rep models. However, this operation is computationally expensive, and checking the collision between the components of two or more objects is inefficient. Further, computing the collision between a point and surface element does not provide accurate information regarding the collision of a point cloud with a CAD model due to gaps and self-intersections between the surfaces of the model.

Voxels, on the other hand, provide a well-defined discretized structure to compute the collisions with nonmanifold data, such as point clouds. Voxels are volumetric elements that represent a CAD model using occupancy information in a 3-D grid, which results in the discretization of the space occupied by an object into a structured, regular grid. Due to voxels being volumetric elements, processing unit 26 can compute the point-membership classification of a point with a voxel using parallel operations. In addition, depending upon the voxel grid resolution or the number of voxels used to represent the model, processing unit 26 can control the bounds and accuracy of the collision computation with another object. In this disclosure, processing unit 26 computes GPU-accelerated collisions between a large point cloud (over 100 million points) with a voxel representation of a CAD model. Processing unit 26 performs a boundary voxelization of the B-rep CAD model of a vehicle using the voxelization method developed by Young and Krishnamurthy 19 to classify the boundary of the object with binary occupancy information. To perform the collision, processing unit 26 first isolates a subset of the entire point cloud data by localizing the region around the object where a collision may occur. Processing unit 26 then performs GPU-accelerated collision detection between the point cloud subset and the vehicle voxel model to determine the feasibility of navigating the vehicle in a predefined path without collisions within the environment.

In a dynamic, confined environment, navigation requires a sizeable clearance for the vehicle to move freely. Accounting for this clearance during the design phase of the vehicle is essential to performing any transportability study. However, exact collision computations between two objects do not provide the necessary information regarding the clearance requirement. In addition, since the outer vehicle shell is a complex shape, increasing the bounding box size alone does not accurately account for this clearance. To facilitate accurate clearance analysis, processing unit 26 develops a voxel-based Minkowski sum operation to create an envelope around the vehicle that can be used to perform the clearance analysis. A Minkowski sum of two sets of vectors representing points in the Euclidean space is the vector addition of each element of the two sets. Processing unit 26 performs the Minkowski sum of the voxel model of a vehicle with a cuboidal voxel grid that conforms to the required clearance value in each orthogonal direction. Then processing unit 26 performs the collision computation between the point cloud and the voxel model resulting from the Minkowski sum operation. This approach provides a flexible framework for the designer to verify the vehicle's operability in the environment with different clearance values. To complement this clearance analysis, processing unit 26 also computes the theoretical bounds of the clearance of the vehicle with the point cloud.

Performing collision detection with the environment represented using point clouds requires additional processing than standard collision detection between two B-rep models. One of the main challenges is to handle potentially massive point cloud data. To accelerate the collision operations, processing unit 26 implements several optimizations. Processing unit 26 first culls the point cloud using the axis aligned model bounding box to reduce the number of points that need to be tested for collision. Second, processing unit 26 performs collision tests with all the points in the isolated point cloud in parallel on the GPU. In addition to these optimizations, processing unit 26 has some special requirements for vehicle model collisions. Processing unit 26 needs an approach to ignore the collision of the vehicle wheels with the floor. In addition, processing unit 26 also needs to ignore any collision with stray points that are usually present in large point cloud data. Finally, in some implementations, processing unit 26 only renders the colliding voxels to improve the rendering performance.

The example systems and methods provide a GPU-accelerated collision detection framework for the navigation of vehicles in large point cloud representations of enclosed spaces using voxels. The collision is computed using a voxel representation of the vehicle with the point cloud, thus eliminating issues in performing collision tests with a tessellated model. They also provide clearance analysis of the collision with theoretical guarantees. For better control over the clearance and collision detection, processing unit 26 developed a GPU-accelerated voxel-based Minkowski sum algorithm to offset the boundary voxels of the vehicle. In addition, they implement the complete framework in a game engine with appropriate rendering to guide the user interactively in making design decisions.

The following examples present a framework to perform collision and clearance analysis of vehicles in environments represented using point clouds. processing unit 26 have developed GPU-accelerated algorithms for envelope calculation and collision detection of the CAD model with a large point cloud. Processing unit 26 provide:

A GPU-accelerated voxel Minkowski sum algorithm to generate an envelope with a user defined clearance.

A GPU-accelerated collision detection method to compute the collision between the voxel model of the vehicle with a point cloud representation of the environment. processing unit 26 provide several culling methods to handle large point cloud models of the environment.

Theoretical bounds for the clearance analysis of vehicles in the point cloud environment.

FIG. 1 is a diagram schematically illustrating portions of an example path collision avoidance 20. System 20 comprises display 24, processing unit 26 and memory 30. Display 24 may be part of a monitor, a touchscreen, a screen on a smart phone or the like. Processing unit 26 follows instructions contained in memory 30. Memory 30 comprises a non-transitory computer-readable medium which contains instructions configured to direct processing unit to carry out a path collision avoidance method, such as the path collision avoidance method 100 shown in FIG. 2.

Figure 2:
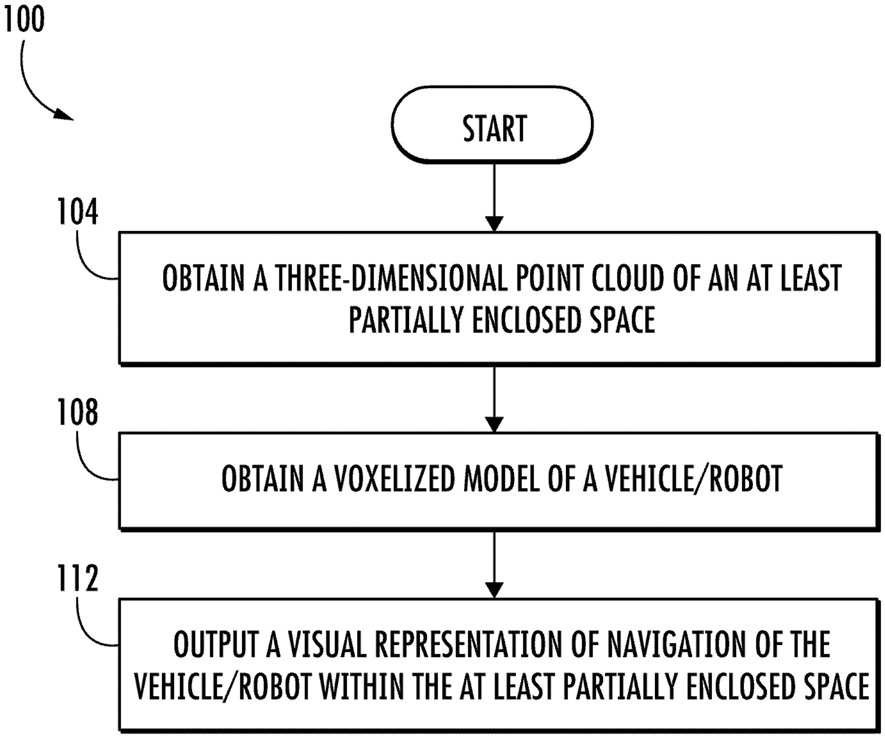
FIG. 2 is a flow diagram of an example path collision avoidance method.

As indicated by block 104 in FIG. 2, instructions in memory 30 direct processing unit 26 to obtain a three-dimensional point cloud 34 (shown in FIG. 1) of an at least partially enclosed space or enclosure. The at least partially enclosed space comprises the structures that define or border the space through which a vehicle/robot may attempt to navigate or attempt to move. In some implementations, obtaining a three-dimensional point cloud 34 may comprise accessing a database of point clouds for different buildings, warehouses or other partially enclosed environments by accessing a server. In some implementations, obtaining a three-dimensional point cloud 34 may comprise controlling or receiving signals from scanners or three-dimensional cameras located throughout the at least partially enclosed space.

As indicated by block 108 in FIG. 2, instructions in memory 30 further direct processing unit 26 to obtain a voxelized or voxel model 38 (shown in FIG. 1) of a vehicle/robot. The vehicle/robot may be in the form of a truck, a plane, a piece of military equipment, a piece of agricultural equipment, a forklift, construction equipment, or the like. The vehicle/robot may be self-propelled or may comprise a self-propelled vehicle pulling an implement, trailer or other device for which collisions must also be evaluated. The vehicle/robot may be operated by a local operator residing on the vehicle, by a remote operator which communicates with the vehicle in a wireless fashion, or in an autonomous manner, wherein a computing device outputs control signals for controlling the propulsion and steering of the vehicle.

In some implementations, obtaining the voxelized model 38 may comprise accessing a voxelized models for different vehicle/robots by accessing a server. In some implementations, obtaining the voxelized model 38 may comprise controlling or receiving signals from scanners or three-dimensional cameras.

As indicated by block 112 in FIG. 2, instructions in memory 30 direct processing unit 26 to output a visual representation or depiction of navigation of the vehicle/robot within the at least partially enclosed space. The visual representation may be displayed on display 24. In some implementations, the visual representation may visually depict locations at which collisions between the vehicle/robot and the at least partially enclosed space are expected. In some implementations, the visual representation may visually depict simulated collisions. In some implementations, instructions in memory 30 further direct processing unit 26 to determine a navigational path of the vehicle/robot within or through the at least partially enclosed space, a navigational path that avoids or minimizes collision or one that minimizes damage to the vehicle/robot and/or the at least partially enclosed space. In some implementations, the instructions in memory 30 may direct processing unit 36 to generate or develop a map of the at least partially enclosed space along with the identified navigational path. In some implementations, the instructions in memory 30 may direct processing unit 26 to output a routine or provide data for use in autonomously navigating the vehicle/robot along the identified navigational path.

For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

The present application is related to the article: Harshil Shah, Sambit Ghadai, Dhruv Gamdha, Alex Schuster, Ivan Thomas, Nathan Greiner and Adarsh Krishnamurthy, "GPU-Accelerated Collision Analysis of Vehicles in a Point Cloud Environment", IEEE Computer Graphics and Applications, Oct. 3, 2022, the full disclosure of which is hereby incorporated by reference.

The following provides details regarding one particular example for the method 100 that may be carried out by system 20.

Vehicle Cad Processing

Voxelization

Figure 3:
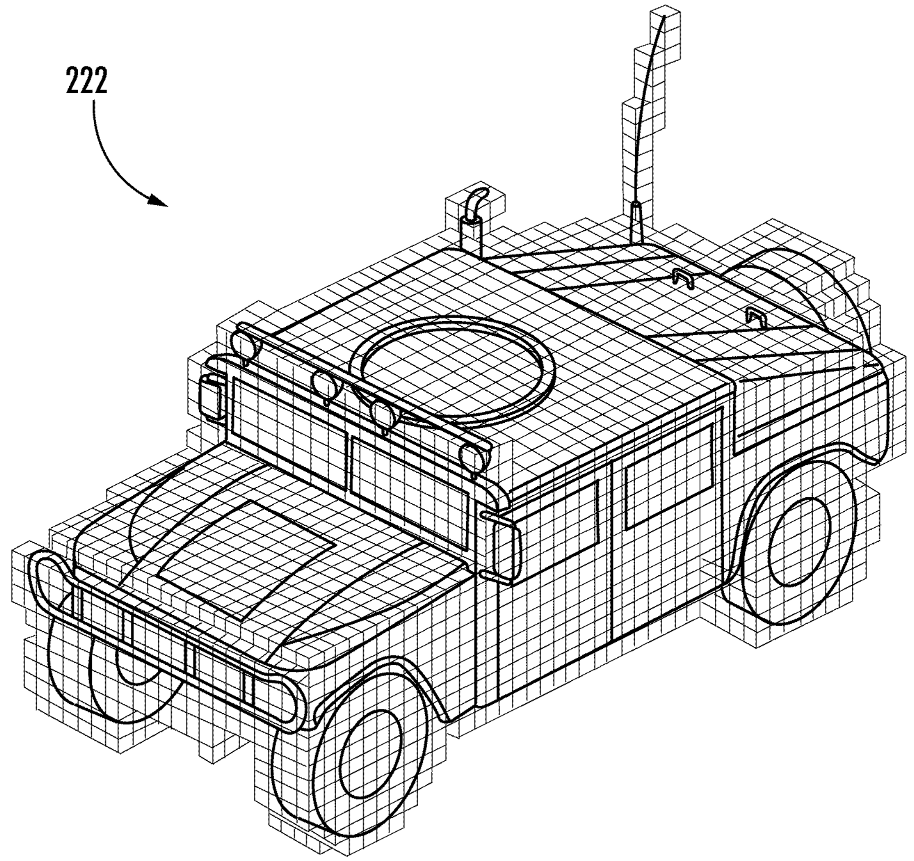
FIG. 3 is a rendering of the voxel representation of an example Humvee CAD model overlapped on the tessellated representation.

As shown by FIG. 3, processing unit 26 obtains a voxel model of an example vehicle/robot 222. In some implementations, processing unit 26, following instructions in memory 30, may voxelize a 3-D B-rep CAD model using a regular voxel grid. First, processing unit 26 may tessellate a B-rep model of the vehicle into a triangle soup or a triangle mesh representation. Then, processing unit 26 voxelizes the triangle soup to generate a voxel grid by marking the individual voxels containing any triangle of the model. processing unit 26 calls this the boundary voxelization, and any voxel that includes part of the boundary of the vehicle CAD model is the boundary voxel. The voxelization is performed in the local coordinate system of the vehicle 222.

To voxelize a triangle soup, processing unit 26 computes an (AABB) bounding the vehicle CAD model. Then, processing unit 26 compute the voxel grid by dividing the AABB based on the desired voxel resolution. To generates the voxelization for the boundary of the solid model, processing unit 26 perform an intersection test of the triangles with each voxel in the grid to check whether it intersects with any triangle, either partially or entirely. processing unit 26 performs boundary voxelization in two steps. First, processing unit 26 identifies the voxels containing the vertices of the triangles and isolate a smaller bounding grid from the entire model voxel grid. In the next step, processing unit 26 checks the intersection between the triangles and the bounds of each voxel in the isolated bounding grid. Based on the test, the intersecting voxels are marked as boundary voxels using a scalar value of 1. The triangle-box intersection test is performed using the separating axis test 8 and is parallelized using the GPU. Details of the algorithm and GPU implementation are explained in Young and Krishnamurthy's work entitled "GPU-accelerated generation in rendering of multi-level voxel representations of solid models.", Computers & Graphics, vol. 75, pp 11-24, 2018, the full disclosure of which is hereby incorporated by reference. Based on the voxel intersection test, processing unit 26 generate a list data structure consisting only of the boundary voxels. This list is then used for the collision tests, reducing redundant computation with empty voxels.

FIG. 3 shows the voxelized representation of a CAD model of a Humvee model along with the tessellated B-rep. This voxel representation of the vehicle forms the basis for the collision computations with the point cloud of the environment as explained in the "Collision Detection" section hereafter.

Voxel-Based Minkowski Sums

The voxelization approach described in the "Voxelization" section computes voxels using a tight bounding box of the vehicle model. Any valid collision with the voxels is considered a model collision. However, processing unit 26 cannot use this voxel grid to identify if a point lies within a certain distance of the model. Processing unit 26 may define this region as the Clearance Zone, which is useful to ensure there is enough clearance around the model while navigating along the desired path. Processing unit 26 computes this clearance zone using the Minkowski sum operation.

Given two sets of vectors $\vec{p}$, $\vec{q}$ representing two polygons P and Q, respectively, the Minkowski sum of the two polygons in Euclidean space is given by:

$$P \oplus Q = \{p\_ + \_q \mid p\_ \in P, \_q \in Q\}$$

Figure 4:
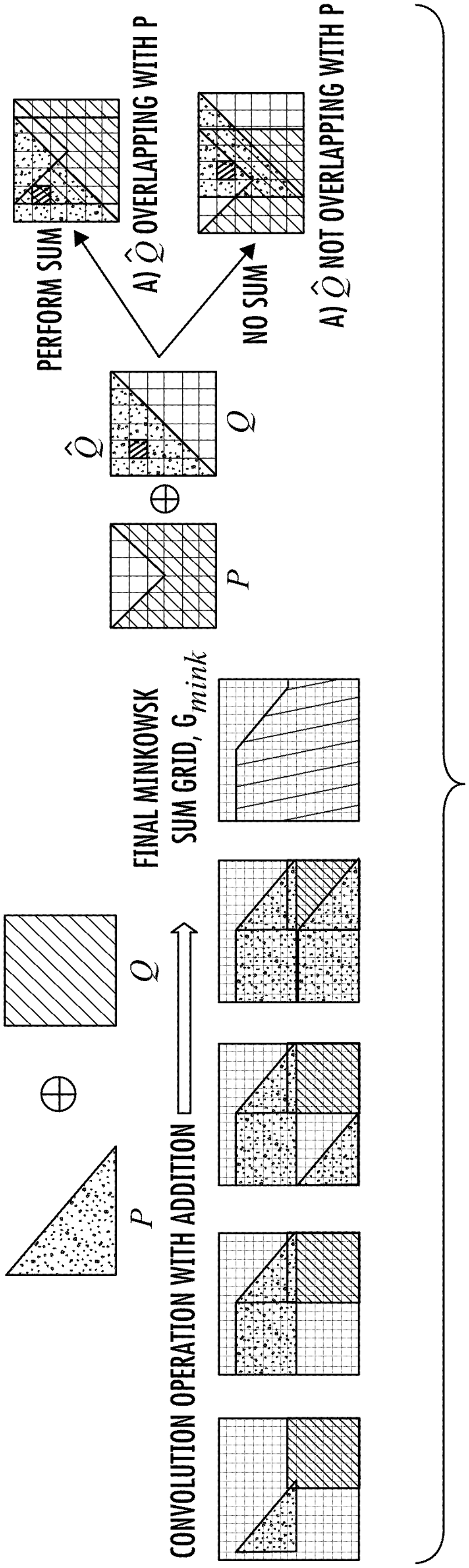
FIG. 4 is a two-dimensional example of voxel-based Minkowski sum.

In voxel space, this can be considered as a variant of the convolution operation of a voxel grid representing Q ($G_Q$) over the voxel grid representing P ($G_P$). processing unit 26 perform the Minkowski sum in voxel space by convolving one grid with another and adding the overlapping voxel values (according to the grid indices) to get the final Minkowski sum voxel grid $G_{mink}$ with the size of $G_P+G_Q$. Processing unit 26 then thresholds $G_{mink}$ for values greater than 0 to create the voxel representation of the Minkowski sum of the two models. To preserve the sizes of the involved polygons or CAD models during the Minkowski sum operation, processing unit 26 voxelize them using the same voxel size. An example in 2-D is shown in FIG. 4.

FIG. 2 is a two-dimensional example of voxel-based Minkowski sum (left). P and Q represent a triangle and a rectangle, respectively. The two-dimensional voxel grid (pixels) of Q is convolved over P, and the values are added with respect to overlapping voxels. $G_{mink}$ is the final Minkowski sum grid obtained after the addition and thresholding of the values. Comparison of polygons P and Q with respect to the position of $\hat{Q}$ during convolution of voxel-based Minkowski sum (right). (a) Shows a case when $\hat{Q}$ overlaps an inside voxel of P, hence index-wise sum of $G_P$ and $G_Q$ are computed. (b) Shows a case during convolution when $\hat{Q}$ does not overlap on P; hence no further sum is computed.

To perform the Minkowski sum operation in voxel space, processing unit 26 first creates an empty voxel grid for Gmink with the number of voxels in the x, y, and z directions as the sum of the voxel grid sizes of GP and GQ. Then processing unit 26 finds a voxel Q^ on GQ (which is to be convolved) belonging to the polygon or CAD model (specifically, a voxel with a scalar value of 1.0). This check is performed to check GP and GQ for comparison and addition based on the corresponding index values of the voxel Q^. Thus, Q^ acts as the basis point of the polygon Q while performing the Minkowski sum operation (shown in detail in FIG. 4 on the right). Further, this operation allows us to perform the Minkowski sum of nonconvex polygons using the same algorithm without any variation in complexity. processing unit 26 then copy the values of GP to an intermediate grid GP I after offsetting the origin of the voxel grid by the index of Q^.

Once processing unit 26 isolates the voxel index of $\hat{Q}$, processing unit 26 proceeds to perform the convolution operation of GP0 and GQ by coinciding $\hat{Q}$ on each of the voxels of $G_P$ ?. Suppose $\hat{Q}$ coincides with a filled voxel of $G_P$ ? (or a voxel with a value 1.0). In that case, processing unit 26 take the element-wise sum of $G_P$ ? and $G_Q$ at that convolution location and store the respective voxel values in the Minkowski voxel grid after thresholding the sums greater than 0 to be 1.0. processing unit 26 repeat this operation for all the convolution steps until processing unit 26 get the complete Minkowski sum voxel grid. The convolution operation for calculating the Minkowski sum is parallelized using the GPU, as described in Algorithm 1 below.

Algorithm 1: Voxel based minkowski sum

Figure 7A:
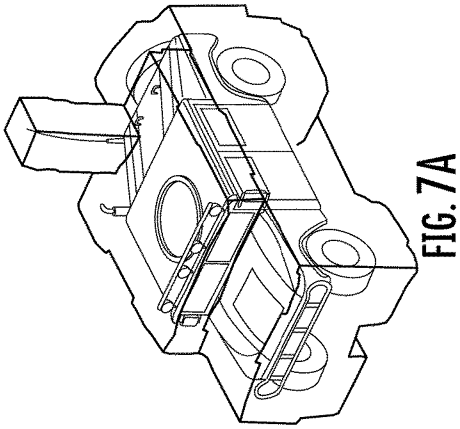
FIGS. 7A, 7B and 7C are isometric front and side views, respectively, of a Minkowski sum of the original example voxel model with another voxel grid a resolution $4^3$.
Figure 7B:
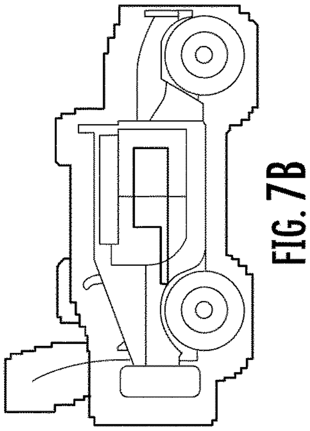
Figure 7C:
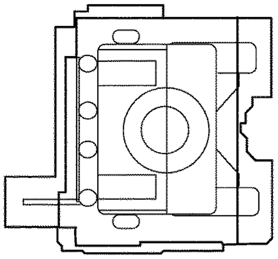
Figure 6A:
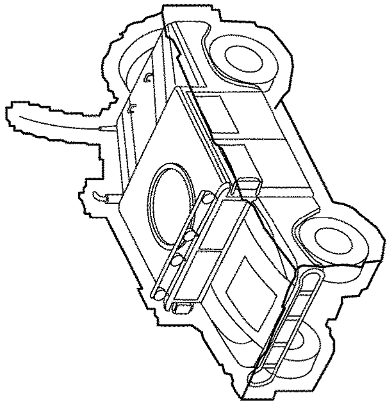
FIGS. 6A, 6B and 6C are isometric front and side views, respectively, of a Minkowski sum of the original example voxel model with another voxel grid a resolution $2^3$.
Figure 6B:
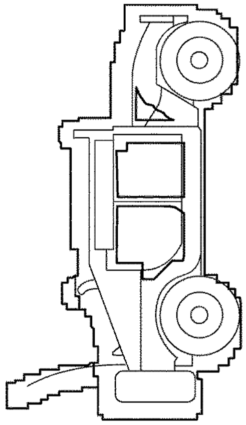
Figure 6C:
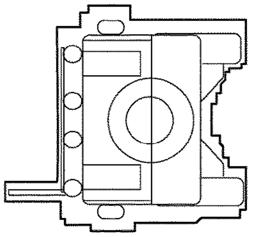
Figure 5A:
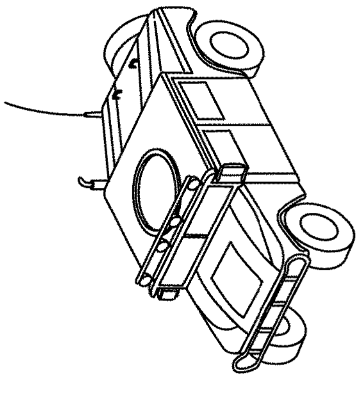
FIGS. 5A, 5B and 5C are isometric front and side views, respectively, of an original example voxel model.
Figure 5B:
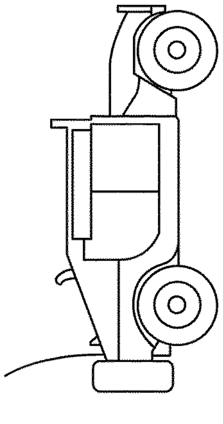
Figure 5C:
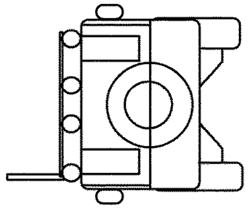

Input: Voxel grids, $G_P$ and $G_Q$
Result: Minkowski sum grid, $G_{mink}$
$P_x, P_y, P_z \leftarrow$ voxel index of $G_P$
$Q_x, Q_y, Q_z \leftarrow$ voxel index of $G_Q$
$\hat{Q}x, \hat{Q}y, \hat{Q}z \leftarrow$ null
foreach Voxel Index, ($ind_x, ind_y, ind_z \in G_Q$ do
  if $G_Q(ind_x, ind_y, ind_z) == 1.0$ then
    $\hat{Q}x, \hat{Q}y, \hat{Q}z \leftarrow ind_x, ind_y, ind_z$
    break
Set $G_PI \leftarrow 0$ ; // grid($P_x + Q_x, P_y + Q_y, P_z + Q_z$)
Copy $G_P$ to $G_PI$ with an index offset of $\hat{Q}x, \hat{Q}y, \hat{Q}z$
forall Voxels $\in G_P$ in parallel do
  if $G_PI\ (P_x + Q_x, P_y + Q_y, P_z, Q_z) + G_Q(Q_x, Q_y, Q_z) \geq 2.0$ then
    foreach Voxel index, ($ind_x, ind_y, ind_z \in G_Q$ do
      if $G_PI\ (P_x + ind_x, P_y + ind_y, P_z + ind_z) \geq 1.0$ then
        $G_{mink}(P_x + ind_x, P_y + ind_y, P_z + ind_z) == 1.0$ FIGS. 5-7 are volumetric renderings of a Humvee CAD model. FIGS. 5A, 5B and 5C illustrate isometric, front and side views, respectively, of the original voxel model. FIGS. 6-7 show the volumetric rendering of a Humvee CAD model with the Minkowski sum operation with two different clearance distances. FIGS. 6A, 6B and 6C depict the Minkowski sum result of the original voxel model with another $2^3$ cubical object, which provides one layer of clearance voxels. Similarly, FIGS. 7A, 7B and 7C illustrate the Minkowski sum result with a $4^3$ cubical object, which provides three layers of clearance voxels.

Collision Detection

Given the path of the vehicle 222, processing unit 26 computes the keyframes based on a user-defined pitch for the collision analysis. For each keyframe, processing unit 26 inputs the vehicle transformation based on the location of the vehicle in the global point cloud coordinate system. Two strategies may be used to perform the collision tests. Based on the selected method of collision test, processing unit 26 uses the keyframe transformation value either on the point cloud data or on the voxel data. Processing unit 26 performs a point membership classification of the point, with each voxel representing the vehicle model and clearance zone. repeat this process for all the keyframes along the path.

Axis-Aligned Point Cloud Culling

Figure 8:
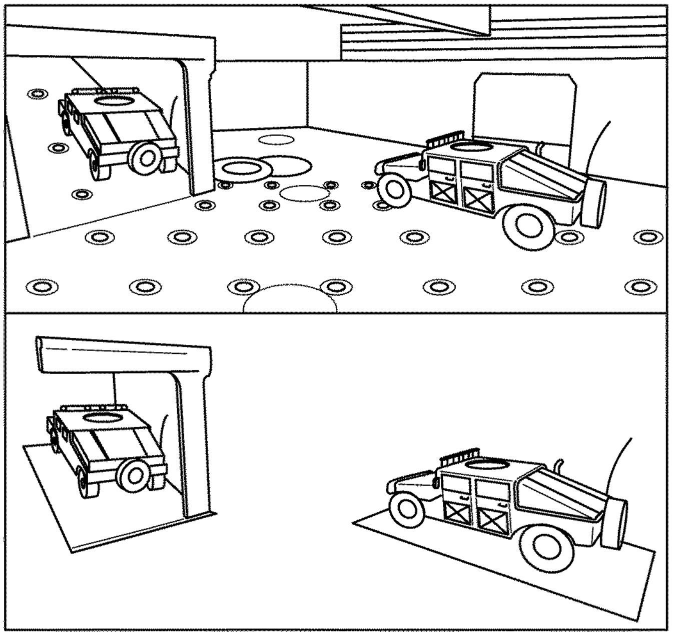
FIG. 8 is a diagram illustrating a subset of points isolated from the point cloud at two locations based upon vehicle position using an example access-line calling region.

Since the point cloud of the environment consists of a large number of points and the vehicle occupies a relatively small region inside the point cloud, processing unit 26 isolates the points from the original point cloud, $P_c$ that are in the vicinity of the vehicle when placed at the keyframe location. processing unit 26 obtains the isolated points $P_{AABB}$ by comparing each point in $P_c$ to the extents of the axis-aligned bounding box, $V_{AABB}$ of the vehicle model. processing unit 26 expand the $V_{AABB}$ to include the points that lie in the clearance zone. This culling process for the point cloud reduces the number of point-voxel collision tests that need to be performed next. FIG. 8 shows the axis aligned culling region of the vehicle at two different locations in a point cloud and the corresponding isolated points. The corresponding algorithm for isolation of points using this method is described in Algorithm 2 below.

Algorithm 2: Axis-aligned culling region isolation

Input: Point cloud, $P_c$, axis-aligned bounding box $V_{AABB}$
Result: Subset of points, $P_{AABB}$
$P_{AABB} \leftarrow$ empty -continued Algorithm 2: Axis-aligned culling region isolation

```
bBox_max ← max(V_AABB)
bBox_min ← min( V_AABB)
foreach Point P (x, y, z) ∈ P_c do
    if P (x, y, z) < bBox_max then
        if P(x, y, z) ≥ bBox_min then
            Add P(x, y, z) → P_AABB
```

Point-Voxel Collision Tests

Figure 9:
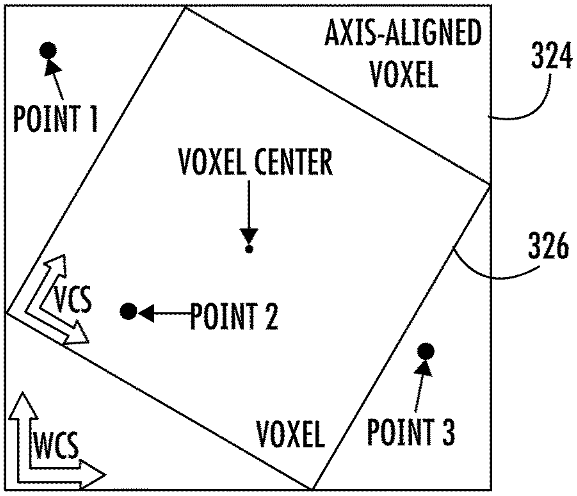
FIG. 9 is a diagram illustrating an example box classification due to rotation of a model, axis-aligned voxel.
Figure 10:
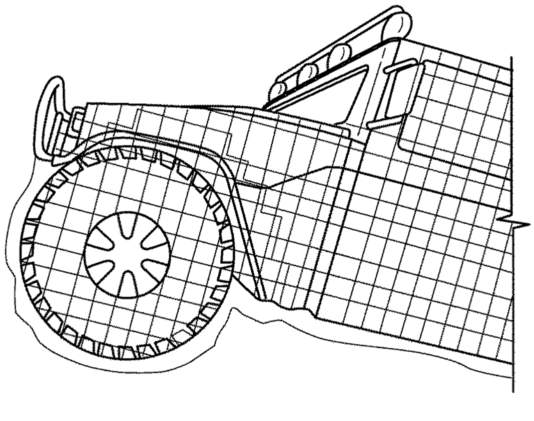
FIG. 10 is a diagram illustrating rotation of a vehicle model that generates rotated voxel coordinate system with respect to a world coordinate system.

Once the points from the complete point cloud data are isolated using axis-aligned culling, processing unit 26 further check each of the points in $P_{AABB}$ for occupancy in each of the individual voxels in the voxel grid representation. processing unit 26 create a collision data structure to count the number of points contained within a voxel. In this method, similar to the axis-aligned culling, processing unit 26 test each point of the isolated point cloud $P_{AABB}$ within the extent of each voxel. A collision count for a voxel is updated if a point lies within the bounds of that voxel. However, for this operation to accurately compute the collisions, the isolated point cloud needs to be transformed to the vehicle coordinate system. An alternative approach is to transform the center of the voxels to the point cloud location using the transformation information of the individual keyframe. This method accurately classifies points within a voxel, but when the vehicle model is at a rotated position, such as on a ramp or steering at any angle, the voxel orientation with respect to world coordinate changes, as shown in FIG. 9. As a result, the extent of the individual voxels is no longer axis-aligned and can result in a false-positive collision result, as shown in FIG. 10. As shown by FIGS. 9 and 10, rotation of the vehicle model generates rotated voxel coordinate system VCS to world coordinate system WCS. In the box classification shown in FIG. 10, due to rotation of the model, and axis-aligned voxel 324 needs to be computed, resulting in points 1-3 (in FIG. 8) being classified as collision. However, only point 2 is a collision as a lies within the extent of the voxel 326.

Algorithm 3A: Parallel collision detection between point cloud and voxels

```
Input: Point cloud, P_AABB,
Voxel grid G, Resolution i^max,
Transformation T Result:
Collision grid, G_collision
G_collision ← empty;                // Same size grid as G
B_min ← min(V);                     // Bounding box min
B_max ← max(V);                     // Bounding box max
Transfer G_collision to GPU
forall Point P ∈ P_AABB in parallel do
    bool collision ← false
    P_Inv ← Invert(T) * P
    Compute voxel index i using P_Inv, B_min, B_max
    if i < i^max and i ≥ 0 and V (i) ≠ empty then
        AtomicAdd G_collision(i)+ = 1.0
        collision ← true
Read G_collision from GPU
```

Alternative Box Classification

In some implementations, the below box classification may be utilized. With this method, similar to axis-aligned culling, the example methods and systems test each point of the isolated point cloud $P_{AABB}$ within the extent of each voxel. A collision count for a voxel is updated if a point lies within the bounds of that voxel. The center of the voxels is transformed to the point cloud location using the transformation information from the individual keyframe. This method actually classifies points within a voxel, but when the vehicle model is at a rotated position, such as on a ramp or steering at an angle, the voxel orientation with respect to the world coordinate changes as shown in FIG. 5. As result, the extent of the individual voxels is no longer axis-aligned and can result in false-positive collision result as shown in FIG. 9.

To eliminate the effect of the rotation of the model, instead of transforming the voxel data to the point cloud, the example systems and methods transform the isolated point cloud data PAABB to the vehicle coordinate system. This transformation ensures the boxes are still axis-aligned and the extents are valid. The relative position of the isolated points is the same as that of the vehicle placed at the selected keyframe. This process is repeated for each keyframe along the path, where isolated point cloud data social with each keyframe is transformed to the model location. The theoretical bounds for the accuracy of this collision test are presented hereafter.

Algorithm 3: Parallel collision detection between point cloud and voxels using Box classification

```
Input: Point cloud, P_AABB, Voxel grid G, Key-frame
Transformation T
Result: Collision grid, G_collision
G_collision ← empty ;               // Same size grid as G
forall Voxel V ∈ G in parallel do
    forall Point P ∈ P_AABB in parallel do
        bool collision ← false
        int Vcount = 0
        V_max ← max(V) ;            // Voxel max extent
        V_min ← min(V) ;            // Voxel min extent
        P_Inv ← Invert(T) * P
        if P_Inv ≤ V_max andP_Inv > V_min then
            Gcollision(V) ← 1.0
            collision ← true
```

Sphere Classification

Another way to eliminate the effect of vehicle rotation in the collision test is to create a circumscribed sphere around individual voxels. Processing unit 26 compute the body diagonal of a voxel as the diameter of the circumscribed sphere D2 and subsequently get the radius of the sphere Rv. The center of an individual voxel is considered the center of the circumscribed sphere. The extent of the severe will remain constant at any rotation of the voxel and thus, does not require any extra computation to account for the rotation.

Algorithm 4: Parallel collision detection of point cloud and voxels using Sphere classification

```
Input: Point cloud, P_AABB, Voxel grid G, Key-frame
Transformation T
Result: Collision grid, G_collision
G_collision ← empty ;               // Same size grid as G
forall Voxel V ∈ G in parallel do
    forall Point P ∈ P_AABB in parallel do
        bool collision ← false
        Center ← Center(V) ;        // Voxel center
        TransCenter = T * Center
        Dist_P ← Distance(TransCenter, P)
        R_V ← Diagonal(V)/2
        if Dist_P ≤ R_V then
            Gcollision(V) ← 1.0
            collision ← true
```

Figure 11:
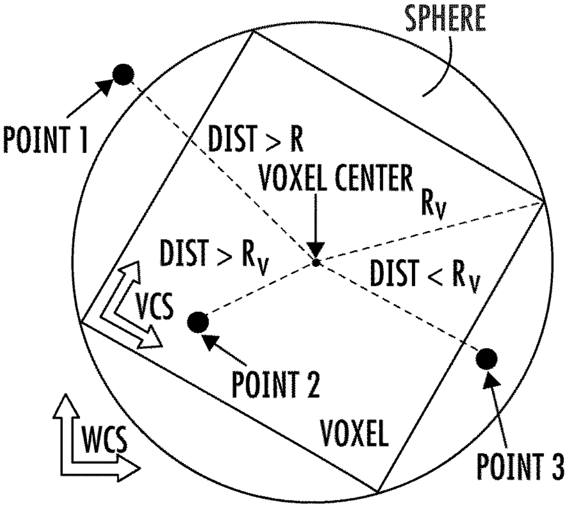
FIG. 11 is a diagram illustrating an example severe classification where a circumscribed sphere is computed for a voxel.

In this classification method, the example transforms Tall voxel data to the point cloud using transformation information for each keyframe. Each point is isolated point cloud PAABB is checked for occupancy in each voxel. The distance between the center of voxel any point from PAABB is less than or equal to Rv, the collision count for voxel is updated (see FIG. 11). This method may give a higher count for the collision than the box classification method as a circumscribed sphere has a larger extent than a voxel. However, this method is computationally less expensive for each keyframe since isolated point cloud can be large for a dense point cloud, which results in more transformation computation in the alternative box classification described above.

Point Cloud Noise Filtering

Figure 12A:
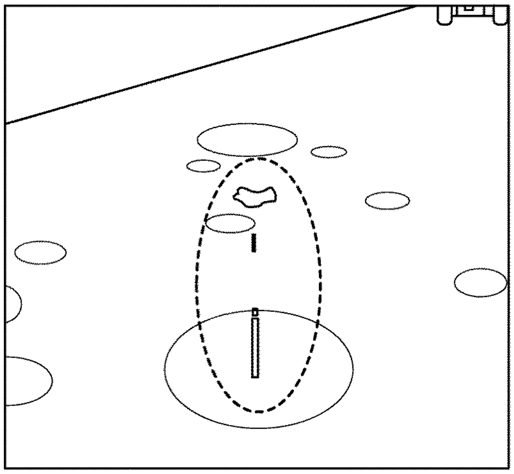
FIG. 12A the diagram illustrating noise and scans data in the form of stranded points and corresponding collision with a vehicle model.
Figure 12B:
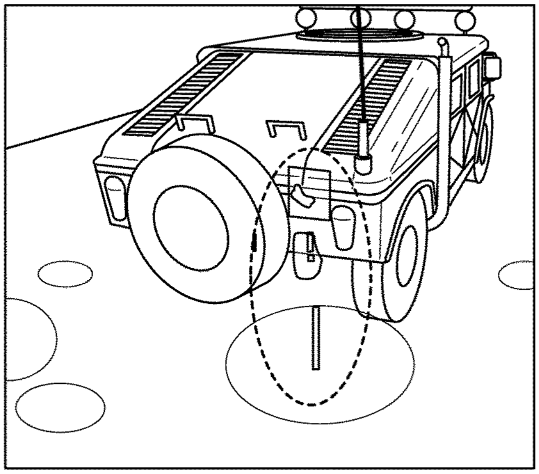
FIG. 12B the diagram illustrating the scan date of FIG. 12A following application of a point cloud threshold for a voxel.
Figure 12C:
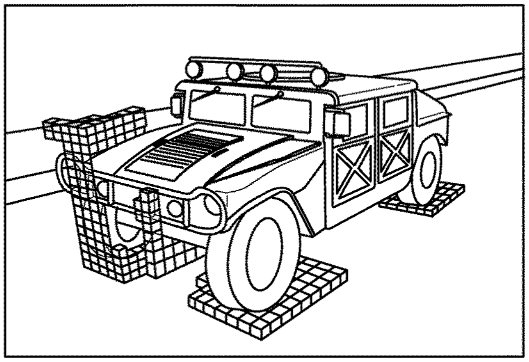
FIG. 12C the day or gram illustrating application of a collision test with a ground collision.
Figure 12D:
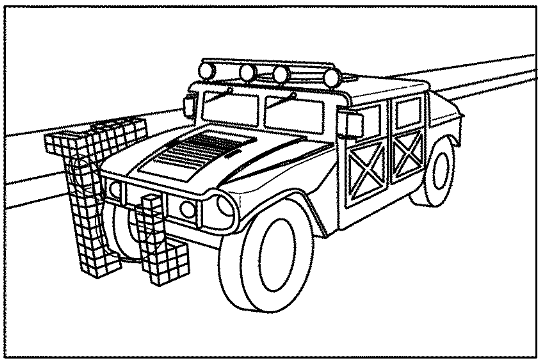
FIG. 12D is a diagram illustrating exclusion applied to both a model and clearance voxels.

The point cloud data can have noise in terms of random scanned points in the space, which does not belong to any surface. These points can be due to scanning errors or inaccurate clean-up during postprocessing. This noise can produce faulty collision along the path, as shown in FIGS. 12A, 12B, 12C and 12D. FIG. 12 a illustrates noise in the scan data in the form of stranded points and corresponding collision with the vehicle model. To avoid this, processing unit 26 set a minimum number of points that a voxel should contain to be classified as a colliding voxel. Processing unit 26 applies a point cloud threshold for a voxel to eliminate such cases. FIG. 12B depicts the collision test run with ground collision included. FIG. 12C illustrates the collision test with ground collision excluded. FIG. 12D illustrates the exclusion applied to both the model and clearance voxels. The minimum number of points may be user-defined and may be adjusted based on the density of the point cloud data.

Excluding Ground Collisions

When the vehicle is navigated in the point cloud data along a specific path, there will be contact between the triangles of the vehicle wheels or tracks (for tracked vehicles) and the ground surface points. These contacts will be classified as collisions. To eliminate this, processing unit 26 select layers of voxels from the bottom of the vehicle voxel grid and ignore them for the collision test. This method will ensure that ground contact is excluded from the collision test irrespective of the type of wheels, such as tires or tracks. FIGS. 12C and 12D shows the collision test results (a) with and (b) without ground contact exclusion at a location.

Bounds for Collision Analysis

In this section, processing unit 26 provides the analysis of the bounds for the collision test for individual voxels. These bounds define the range at which a point will be classified as occupied in a voxel. The bounds are defined for both model and clearance voxels. These bounds assist in the selection of the voxelization resolution and adjustment of the clearance distance value based on the desired degree of collision analysis.

Figure 13:
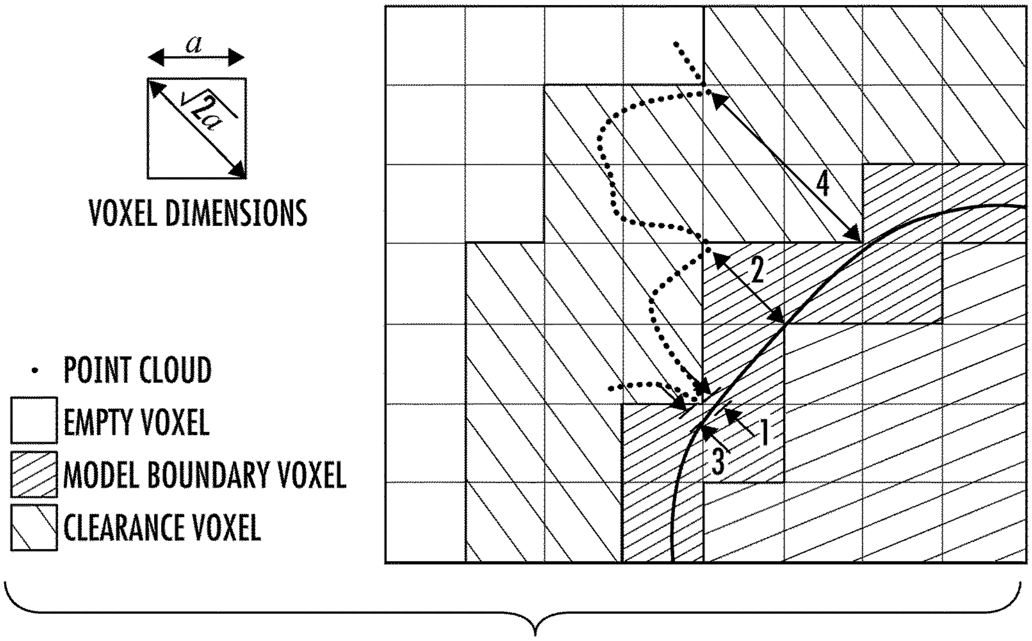
FIG. 13 is a diagram illustrating point classification bounds for remodeling clearance voxels in two dimensions.

FIG. 13 shows an example of voxelization and setting 2 layers of clearance zone voxels. processing unit 26 presents a few cases to establish the bounds of the classification. In any given voxel marked Red, the boundary of the model is partially or completely contained within that voxel. For such a case, a point present close to the boundary will classify the voxel as a collision (Distance 1 in FIG. 13). In a case where the boundary of the model coincides with or is close to a corner of the voxel, the maximum distance at which the point will be considered occupied is the body diagonal of the voxel (Distance 2 in FIG. 13). Thus, if a is the voxel size, the bounds for collision with a model voxel are given by the following:

$$\text{Model voxel}\begin{cases} D_{min} \approx 0 \\ D_{max} = \sqrt{3}\,a \end{cases}.$$

The following table provides details on the resolutions used for the collision analysis and timing to compute the voxelization and clearance zone using Minkowski sums.

TABLE 1

| Resolution | Grid size | Voxel size (cm) | Collision accuracy (cm) | # Clearance layers | Total voxels | Occupied voxels | Voxelization time (s) |
|---|---|---|---|---|---|---|---|
| 48R | 48 × 28 × 24 | 10.154 × 9.427 × 9.933 | 17.048 | 3 | 55,080 | 28,677 | 0.486 |
| 64R | 64 × 36 × 32 | 7.615 × 7.332 × 7.450 | 12.932 | 4 | 126,720 | 85,140 | 0.559 |
| 96R | 96 × 52 × 48 | 5.077 × 5.076 × 4.987 | 8.730 | 6 | 414,720 | 209,382 | 0.921 |
| 128R | 128 × 72 × 64 | 3.808 × 3.666 × 3.725 | 6.466 | 8 | 1,013,760 | 508,337 | 1.799 |

Similarly, due to the voxelization structure, a clearance voxel can lie close to the boundary of the model. In such a case, a point close to the boundary can be classified as occupied in a clearance voxel (Distance 3 in FIG. 13). Similar to the model voxel, the maximum distance at which a point will be considered occupied in the clearance voxel is the summation of the body diagonal distance along the connected clearance voxels (Distance 4 in FIG. 13). Thus if a is the voxel size, the bounds for collision with a clearance voxel are given by the following, where k is the number of clearance voxel layers:

$$\text{Clearance voxel}\begin{cases} D_{min} \approx 0 \\ D_{max} = k\sqrt{3}\,a \end{cases}.$$

Collision Test Results

This section describes the collision test results between a large point cloud and a vehicle model for several locations within the point cloud. Processing unit 26 selects a ship scan as point cloud data. The data contains more than 127 million points, and the size of the scanned ship is 144.67 m×51.44 m×22.64 m. The scan has different decks accessed by ramps with vast navigation areas. For a vehicle model, processing unit 26 select a standard Humvee vehicle. The model contains 955,772 triangles and has the dimension of 4.87 m×2.54 m×2.38 m.

The collision method carried out by processor 26 for four different resolutions of the vehicle model is given in Table 1 below. The number of layers of clearance voxels is based on the desired clearance zone distance. In these tests, processing unit 26 set the clearance distance at 30 cm. The distance value is kept constant by adjusting the number of clearance layers for each resolution since the resolution changes the voxel sizes. The resolution is the maximum length along the axis of the voxel grid encompassing the vehicle. The collision accuracy of the algorithm is defined to be the length of the voxel diagonal as given by (2). Since the clearance distance is fixed, the number of clearance layers increases as processing unit 26 increase the resolution. The total voxels correspond to the sum of model voxels and clearance voxels in the table; the occupied voxels correspond to the voxels that contain the model boundary. The voxelization time corresponds to the time required to voxelize the vehicle model and perform the Minkowski sum to add clearance layers. processing unit 26 can see that the model can be voxelized to a high resolution of 128×72×64 and add eight layers of clearance voxel in less than 2 seconds. Since this operation is only performed once per vehicle during the vehicle load, this time is amortized over all the subsequent collision analyses. This time is hidden by the scene loading latency when Unreal Engine loads the model.

Figure 14:
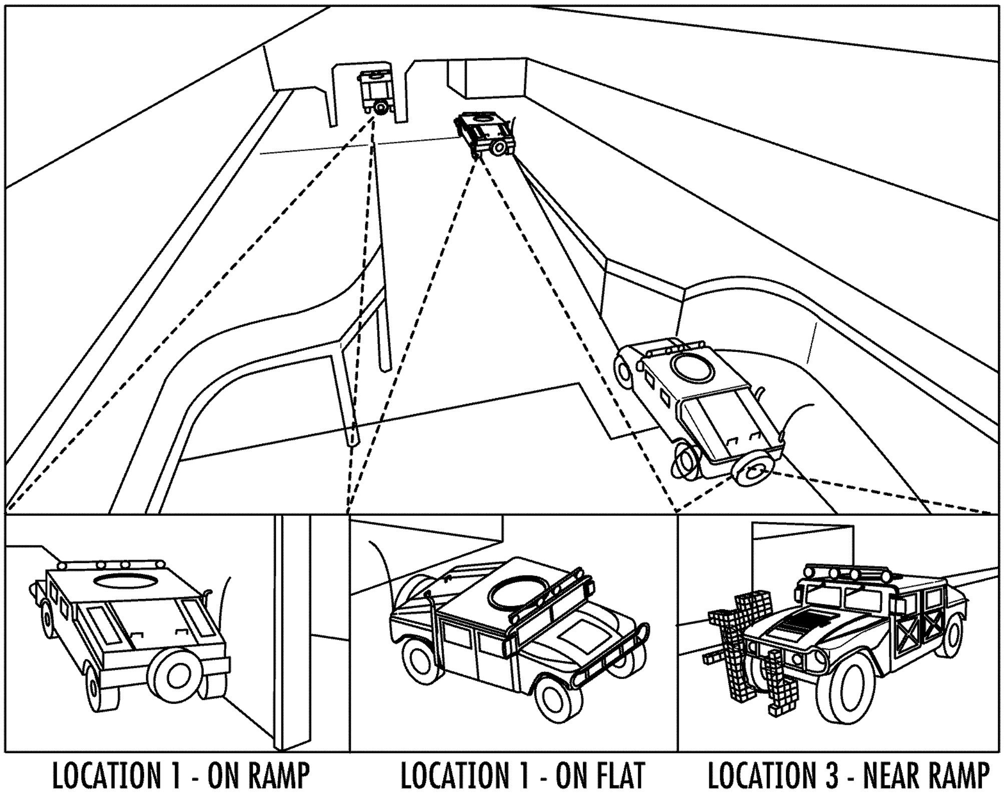
FIG. 14 is a diagram illustrating rendering of an example collision analysis for three example locations in Unreal Engine with a selected resolution of 48R, wherein red boxes represent model collision and yellow boxes represent clearance zone violations.

In the example, processing unit 26 has selected three locations to test the example method along a path. Location 1 is an open area with clear surroundings, Location 2 is on a ramp with a narrow passage, and Location 3 is at the start of a ramp where processing unit 26 intentionally collide with a pillar. Table 2 shows the results for all three locations. The tests are run on NVIDIA TITAN XP GPU using CUDA libraries. All the results shown in the table exclude the ground contact collision. The collision time in Table 2 is defined to be the time required to determine the presence of colliding voxels (model or clearance) by checking the presence of collision between the points in the point cloud with the model or clearance voxels. FIG. 14 shows the collided voxels rendered for all three locations (more details in the "Implementation" section). The rendering includes model voxels (red) and clearance voxels (yellow). In the case of Location 1, since the vehicle is located in an open space with ground contact collision excluded, no voxels are classified as collision. Location 2 on the ramp is the most complicated case since the axis-aligned culling region also includes the sidewalls of the ramp, increasing the number of isolated points to be above 750,000. Location 3 is of intermediate complexity consisting of about 200,000 isolated points in the axis-aligned culling region.

TABLE 2

| Loc. | Resolution | Isolated points | Collision time (ms) | # Colliding Voxels model | # Colliding Voxels clearance | Colliding points |
|---|---|---|---|---|---|---|
| On flat | 48R | 114,894 | 1.526 | 0 | 0 | 0 |
| | 64R | 115,513 | 2.534 | 0 | 0 | 0 |
| | 96R | 115,805 | 3.113 | 0 | 0 | 0 |
| | 128R | 115,513 | 4.159 | 0 | 0 | 0 |
| On ramp | 48R | 767,761 | 4.174 | 0 | 1850 | 107,354 |
| | 64R | 770,264 | 4.911 | 0 | 2793 | 102,108 |
| | 96R | 773,637 | 4.613 | 0 | 5578 | 91,835 |
| | 128R | 770,264 | 5.651 | 0 | 7320 | 90,739 |
| Near ramp | 48R | 207,329 | 2.448 | 114 | 246 | 19,403 |
| | 64R | 209,458 | 2.967 | 137 | 440 | 20,019 |
| | 96R | 210,161 | 3.415 | 189 | 992 | 20,552 |
| | 128R | 209,458 | 4.381 | 232 | 1418 | 20,771 |

The example methods and systems provide the collision timing details for the three locations at four resolutions starting from 48R to up to 128R in Table 2 above. The isolated points in the axis aligned culling region are further used for collision testing. The collision time is mainly determined by the number of isolated points in the region since these points need to be transformed from the WCS to the vehicle coordinate system. This process is performed in parallel with the GPU. Since Algorithm 3 is independent of voxel resolution, processing unit 26 can observe that the collision time stays almost constant, especially for high point regions, such as the on-ramp case, where time contribution from other factors, such as memory transfer, becomes negligible. The small increase in collision time with resolution directly corresponds to the time taken for the data transfer of the voxels from the CPU to the GPU memory and then reading back the colliding voxels from the GPU to the CPU memory.

Figure 15:
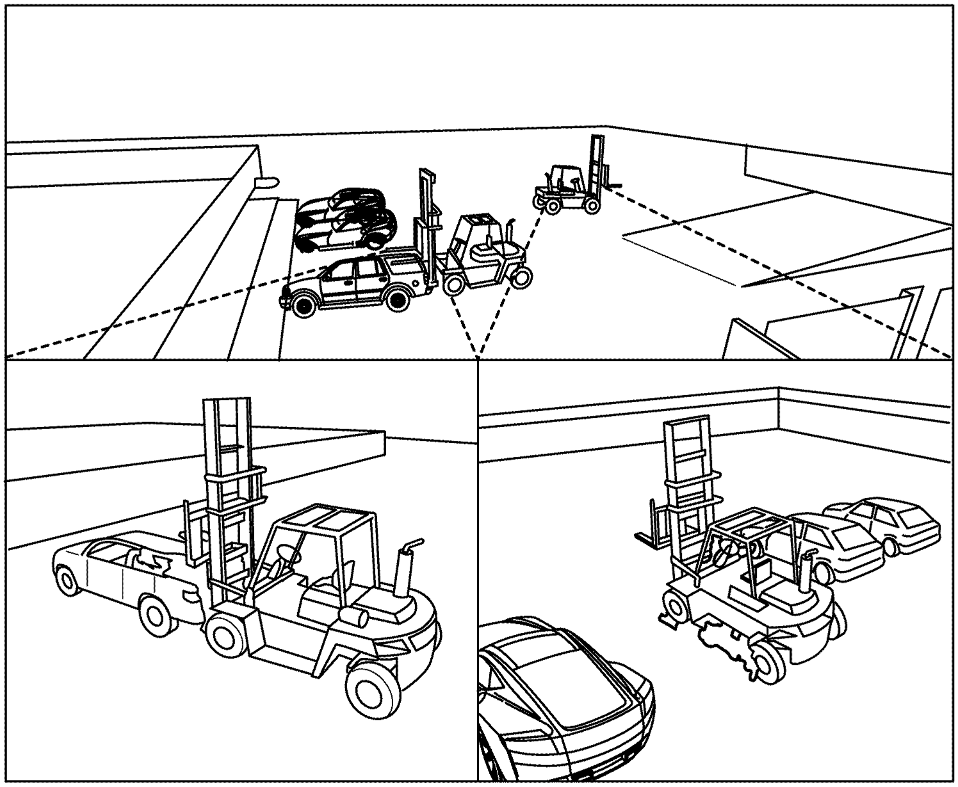
FIG. 15 is a diagram illustrating rendering of an example collision analysis for an example forklift model in a large point cloud of an example parking lot with an example resolution of 48R, wherein red boxes represent the model collision and yellow boxes represent clearance zone violations.

To demonstrate the generalizability of the example framework, processing unit 26 may perform another collision test using a forklift vehicle and a point cloud data of an open parking lot space in an industrial area. FIG. 15 shows the voxelized forklift vehicle along with the vehicle colliding with the point cloud data corresponding to a car in the open area. This example shows that processing unit 26 can easily extend our framework to other vehicles and point cloud data.

Implementation

Processing unit 26 may utilize the Unreal Engine to implement the example method and visualize the result. Unreal Engine allows visualization of a large point cloud data which is integrated with a custom C++ library. The game engine also allows navigation of the vehicle model and generation of the desired path, as shown in FIG. 15. FIG. 15 illustrates the example implementation of the collision analysis with Unreal Engine to render the large point cloud data and visualize the collision results for selected keyframes. The voxelization and collision tests are performed in parallel using the GPU and the custom CUDA library written in C++.

Figure 16:
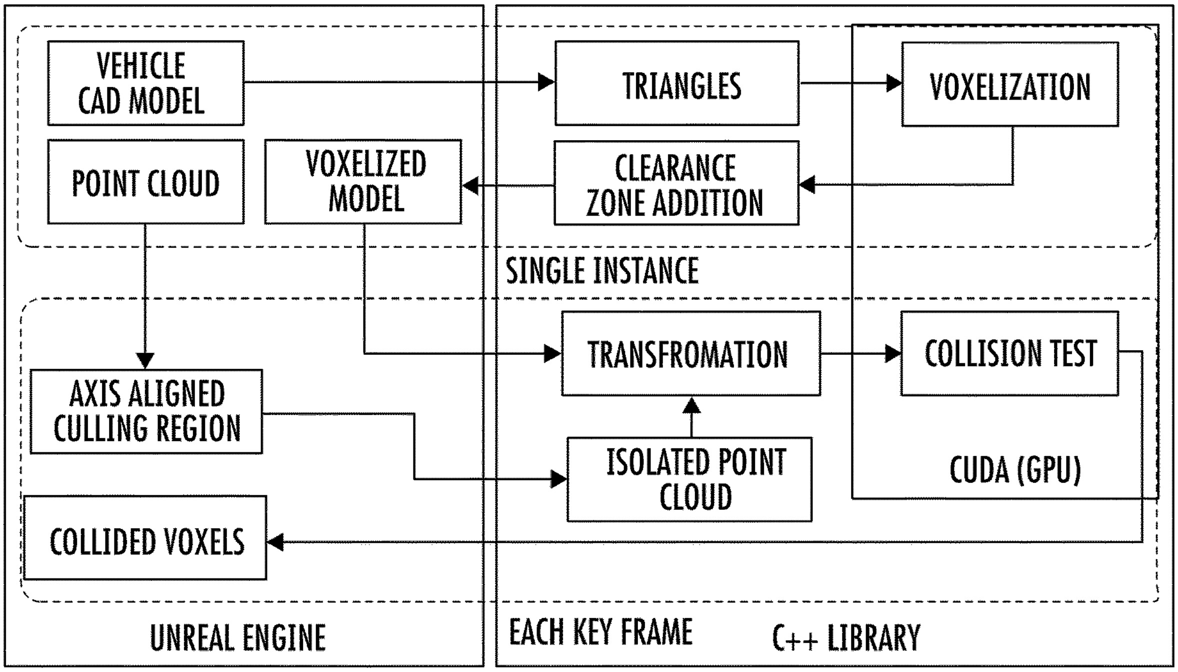
FIG. 16 diagram illustrating an example implementation of collision analysis with Unreal Engine, wherein the Engine renders a large point cloud data and visualizes collision results for selected keyframes.
Figure 17:
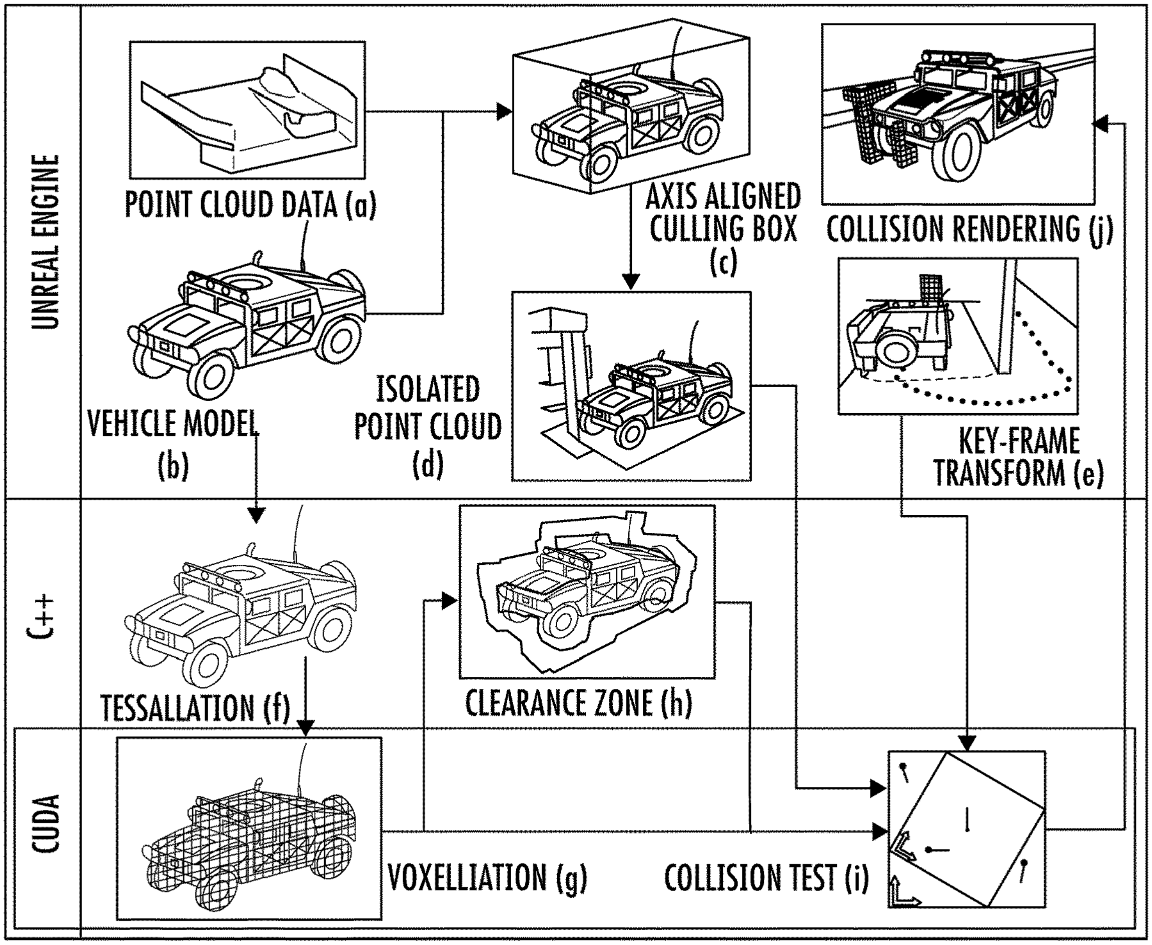
FIG. 17 is a pictorial diagram illustrating the example implementation of collision analysis outlined in FIG. 16.

For each keyframe, processing unit 26 gets transformation information of the keyframe. The isolated point cloud for each keyframe is computed and passed to the collision library. The library implements the box classification and is parallelized using the CUDA library. FIGS. 16 and 17 illustrate the process flow for the collision test using Unreal Engine and CUDA functions in the custom C++ library.

The voxelization is performed on a tessellated model based on the selected resolution. The clearance zone is added to the voxelization grid based on the input clearance value. The voxelization and clearance zone data (VnC) are generated once per resolution and stored in memory. This VnC data can be used for any path for a given resolution. The VnC data contains information on voxel type (model or clearance) and the voxel center. This information is then transferred to the GPU to perform the collision analysis.

The collision test is performed using the VnC and keyframe information. After running the collision test on the GPU, processing unit 26 reads back the collision data for each keyframe to the CPU memory and then transfers it to Unreal Engine for rendering. The collision data contains the binary classification for nonempty voxels in the VnC as colliding (1) or noncolliding (0). The user can analyze further any particular keyframe of interest by rendering the vehicle model and the corresponding colliding voxels at that location.

Overall, the example framework is general enough to handle a diverse set of point cloud data and vehicle models, as demonstrated by the two examples provided in the "Collision Test Results" section. One of the main contributions of the example approach is the use of Minkowski sums to compute the clearance envelope of the vehicle. This approach is specifically useful for ensuring a viable clearance around the vehicle while navigating tight spaces, such as inside ships. For each real number a, an a-complex of the given set of points is the simplicial complex formed by the set of edges and triangles whose radii are at most 1=a. Based on the clearance value required, processing unit 26 can compute the corresponding a-complex of the vehicle model and perform collision detection. The Minkowski sum is the generalization of this approach to a closed set of points that form a closed shape in 2 or 3-D. Further, in the example implementations, processing unit 26 performs the Minkowski sum using voxels, enabling operation in parallel using the GPU.

In some implementations, to address false positive collisions in a noisy point cloud data, processing unit 26 (following instructions in memory 30) may consider a voxel colliding only if it encloses more than a user defined number of points. Processing unit 26 may interactively adjust this user-defined number of points to avoid false-positive collisions. In addition, since processing unit 26 excludes the bottom few layers of the model to exclude ground collision with the tires of the vehicle, this can lead to missing some collisions of the tires with low-height obstacles on the ground. On the other hand, example approach still preserves voxels along the floorboard of the vehicle. These voxels ensure that processing unit 26 still capture the vehicle bottoming out on steep ramps.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A path collision avoidance system comprising:

a display;

a processing unit; and a non-transitory computer-readable medium containing instructions configured to direct the processing unit to:

obtain a three-dimensional point cloud of an at least partially enclosed space;

obtain a voxelized model of a vehicle/robot;

output a visual representation of navigation of the vehicle/robot within the at least partially enclosed space on the display based on the three-dimensional point cloud of the at least partially enclosed space and the voxelized model of the vehicle/robot.

2. The system of claim 1, wherein the instructions are further configured to direct the processing unit to apply a Minkowski sum algorithm to generate an envelope with a user defined clearance.

3. The system of claim 1, wherein the instructions are further configured to direct the processing unit to apply an axis-aligned cloud culling to an initial three-dimensional point cloud of the at least partially enclosed space.

4. The system of claim 1, wherein the instructions are further configured to direct the processing unit to identify bounds for a collision of the vehicle/robot with the at least partially enclosed space.

5. The system of claim 1, wherein the instructions are further configured to direct the processing unit to determine a desired navigational path of the vehicle/robot, wherein the output of the visual representation of navigation of the vehicle/robot comprises navigation of the vehicle/robot along the desired navigational path.

6. The system of claim 5, wherein the instructions are further configured to direct the processing unit to output control signals to the vehicle/robot to autonomously control navigation of the vehicle/robot along the desired navigational path between boundaries within an interior of the at least partially enclosed space.

7. The system of claim 1, wherein the instructions are further configured to direct the processing unit to output control signals so as to obtain a three-dimensional scan of the at least partially enclosed space to obtain the three-dimensional point cloud of the at least partially enclosed space.

8. A path collision avoidance method comprising:

obtaining a three-dimensional point cloud of an at least partially enclosed space;

obtaining a voxelized model of a vehicle/robot;

outputting a visual representation of navigation of the vehicle/robot within the at least partially enclosed space based on the three-dimensional point cloud of the at least partially enclosed space and the voxelized model of the vehicle/robot.

9. The method of claim 8, wherein the obtaining of the voxelized model of the vehicle/robot comprises applying a Minkowski sum algorithm to generate an envelope with a user defined clearance.

10. The method of claim 8, wherein the obtaining of the three-dimensional point cloud of the at least partially enclosed space comprises applying an axis-aligned cloud culling to an initial three-dimensional point cloud of the at least partially enclosed space.

11. The method of claim 8 further comprising identifying bounds for a collision of the vehicle/robot with the at least partially enclosed space.

12. The method of claim 8 further comprising determining a desired navigational path of the vehicle/robot, wherein the output of the visual representation of navigation of the vehicle/robot comprises navigation of the vehicle/robot along the desired navigational path.

13. The method of claim 12 comprising autonomously controlling navigation of the vehicle/robot along the desired navigational path between boundaries within an interior of the at least partially enclosed space.

14. The method of claim 8, wherein the obtaining of the three-dimensional point cloud of the at least partially enclosed space comprises scanning the at least partially enclosed space.

15. The method of claim 8, wherein the obtaining of the three-dimensional point cloud of the at least partially enclosed space comprises obtaining a three-dimensional point cloud of walls between which the vehicle/robot is to navigate.

16. The method of claim 8, wherein the voxelized model of the vehicle/robot comprises clearance voxels, wherein a collision is determined in response to intersection of the clearance voxels by the three-dimensional point cloud of the at least one enclosed space.

17. The method of claim 8, wherein the obtaining of the three-dimensional point cloud of the at least partially enclosed space comprises obtaining a three-dimensional point cloud of a ramp upon which the vehicle/robot is to navigate.

18. The method of claim 8, wherein the obtaining of the three-dimensional point cloud of the at least one partially enclosed space comprises accessing a database of point clouds for different interiors of different buildings.

* * * * *